United States Patent [19]

Lupo et al.

[11] 4,304,150
[45] Dec. 8, 1981

[54] TRANSMISSION UNIT FOR MOTOR VEHICLES

[75] Inventors: Giorgio Lupo, Rivalta; Pier G. Castelli, Turin, both of Italy

[73] Assignee: Fiat Auto, S.p.A., Turin, Italy

[21] Appl. No.: 57,233

[22] Filed: Jul. 12, 1979

[30] Foreign Application Priority Data

Jul. 13, 1978 [IT] Italy ............................ 68660 A/78

[51] Int. Cl.³ .................... F16H 47/04; F16H 47/08
[52] U.S. Cl. .................... 74/677; 74/665 GE; 74/681; 74/718; 74/731; 474/11; 474/13; 474/15; 474/70; 474/72; 474/73; 474/74
[58] Field of Search ............ 74/731, 718, 677, 681, 74/720, 665 GE; 474/11, 13, 14, 15, 16, 70, 72, 73, 74, 84

[56] References Cited

U.S. PATENT DOCUMENTS

| | | | |
|---|---|---|---|
| 2,847,876 | 8/1958 | Willard et al. | 74/681 |
| 3,011,353 | 12/1961 | Friedrich et al. | 474/72 |
| 3,043,162 | 7/1962 | Kugel et al. | 74/720 X |
| 3,203,277 | 8/1965 | General | 74/681 X |
| 3,256,751 | 6/1966 | Tuck et al. | 74/718 |
| 3,479,908 | 11/1969 | Kress et al. | 74/681 |
| 3,610,062 | 10/1971 | Hoff | 474/70 |
| 3,653,273 | 4/1972 | Albertson et al. | 474/74 |
| 3,850,050 | 11/1974 | Lemmens | 474/13 |
| 3,926,020 | 12/1975 | Dantowitz et al. | 474/11 |
| 4,125,037 | 11/1978 | Palmer et al. | 74/732 |

FOREIGN PATENT DOCUMENTS

| | | | |
|---|---|---|---|
| 333120 | 12/1935 | Italy | 474/3 |
| 627383 | 10/1961 | Italy | 74/665 GE |
| 793263 | 4/1958 | United Kingdom | 74/718 |
| 2025545 | 1/1980 | United Kingdom | 74/732 |

*Primary Examiner*—Leslie Braun
*Attorney, Agent, or Firm*—Sughrue, Mion, Zinn, Macpeak and Seas

[57] ABSTRACT

A motor vehicle transmission unit provided with an automatic variable ratio transmission mechanism and a supplementary fixed ratio transmission mechanism which transmits torque from an input shaft to an output shaft of the unit in conditions of low speed and high torque. A free wheel clutch allows the variable ratio transmission mechanism to take over the drive when the speed increases, this being accomplished by means of an automatic speed sensitive clutch which engages when the speed of the output shaft reaches a predetermined threshold valve. A torque converter or other progressive coupling device links the input shaft of the unit, via an isolating friction clutch, to the fixed ratio transmission mechanism.

17 Claims, 3 Drawing Figures

TRANSMISSION UNIT FOR MOTOR VEHICLES

The present invention relates generally to a transmission unit for a motor vehicle, and particularly to a transmission unit of the type comprising a drive shaft, a driven shaft for connecting the unit to the propulsion members of the vehicle, and variable ratio drive transmission mechanism for interconnecting the drive and driven shafts. This may be an automatically variable transmission mechanism and conveniently may be an infinitely variable transmission mechanism.

In motor vehicles having known transmission units of the above type, the power transmitted by the engine to the wheels (which constitute the propulsion members in most cases) always passes through the variable ratio transmission. This latter must therefore be dimensioned in such a way as to be able to withstand the high torque applied when the vehicle is moving off from rest. However these conditions occur for only a small fraction of the time for which the transmission is operating. Known transmission units are therefore "over-dimensioned" with respects to normal running conditions of the motor vehicle, that is to say the mechanism is much stronger than is required to meet the majority of the conditions in which the vehicle will be operated.

The above considerations are valid not only for motor vehicles, such as motor cars and motor lorries, but also for land vehicles of any type, especially if provided with an internal combustion engine, such as agricultural tractors and earth moving machines. The same considerations can be extended to boats with screw propulsion provided with a constant speed engine and a system for varying the speed of rotation of the driving screw.

The technical problem which the present invention seeks to solve is that of providing a transmission unit of the general type mentioned above, in which the variable ratio drive transmission mechanism can be dimensioned in such a way as to resist only the torque exerted during normal running of the vehicle, with a consequent reduction of cost with respect to known transmission units of this general type, whilst nevertheless allowing the full transmission of power from the engine to the propulsion members of the vehicle when moving off from rest.

According, therefore, to the present invention, there is provided a transmission unit for a motor vehicle, of the type comprising a drive shaft, a driven shaft for connecting the transmission unit to the propulsion members of the vehicle, and an automatic variable ratio transmission mechanism for interconnecting the drive shaft and the driven shaft, characterized in that there are further provided an automatically controlled friction clutch disposed mechanically in series with the variable ratio transmission mechanism, control means for the friction clutch sensitive to the angular velocity of the driven shaft, for maintaining the friction clutch disengaged below a predetermined angular velocity of the driven shaft, and engaged above this predetermined angular velocity, and a series arrangement comprising a fixed ratio transmission mechanism and a free wheel clutch disposed mechanically in parallel with the series arrangement of the friction clutch and the variable ratio transmission mechanism between the drive shaft and the driven shaft, the free wheel clutch being able to transmit drive from the drive shaft to the driven shaft through the fixed ratio transmission mechanism.

In a transmission unit formed as an embodiment of the present invention, the high torque exerted when the vehicle is moving off from rest is transmitted from the engine to the wheels, or other propulsion members of the vehicle, through the fixed ratio transmission mechanism and the free wheel clutch. The speed at which the controlled friction clutch becomes engaged is pre-established in such a way that the vehicle must be accelerated to an extent sufficient to ensure that the moving off phase is completed before the changeover takes place. With the engagement of the controlled friction clutch, the variable ratio transmission takes over the transmission of drive from the fixed ratio transmission. This is possible because of the presence of the free wheel clutch.

Preferably, the input of the series arrangement comprising the automatically controlled friction clutch and the variable ratio transmission mechanism is connected directly to the drive shaft, and the input of the series arrangement comprising the fixed ratio transmission mechanism and the free wheel clutch is connected to the driven shaft by means of a progressive coupling. Such coupling can be an hydraulic torque converter, a centrifugal clutch or an hydraulic coupling. This arrangement is particularly advantageous if the variable ratio transmission mechanism is a friction transmission mechanism, such as, for example, a transmission mechanism of the type having expandable pulleys and metal belts, known as the "V.D.T." or "Van Doorne" type.

In transmission mechanism of this general type, however, the possible range of variation of the transmission ratios, the so-called "span" of the transmission is not really very great. In fact their "span" rarely exceeds a value equal to four. For use in motor vehicles this limitation of the "span" of the transmission means that it is effectively impossible to provide a significant overdrive effect, whereas this is a desirable feature which would be useful for the purpose of reducing the fuel consumption of the vehicle. In fact, because it is necessary to arrange for the maximum reduction ratio or "low gear" of the variable transmission mechanism to be suitable for overcoming the maximum slope which the vehicle is expected to encounter and for rendering the initial acceleration upon moving off sufficiently rapid, it is difficult to make the minimum reduction ratio, that is to say the "high gear", even substantially equal to that obtainable with the direct or top gear of a conventional manual gearbox, and is practically impossible to provide an overdrive ratio.

With such "V.D.T." transmissions or the like there is normally associated a centrifugal clutch or an hydraulic coupling device by means of which the initial acceleration of the vehicle when moving off slowly takes place in a very smooth and gradual manner, for example during parking manoevres, but this does not allow a particularly sparkling performance upon moving off from rest.

In a preferred embodiment of the invention, the progressive coupling device is an hydraulic torque converter. In this case the torque converter renders the range of variation of ratios wider than that of the variable ratio transmission mechanism alone, and this permits a better performance to be obtained when moving off from rest, when the torque is transmitted, downstream of the torque converter, through the fixed ratio transmission mechanism.

Conveniently, if the transmission unit is provided with an hydraulic torque converter, the fixed ratio transmission mechanism may have a reduction ratio substantially equal to the maximum reduction ratio of the variable ratio transmission mechanism, multiplied by the minimum coefficient of slip of the torque converter.

This takes account of the fact that even during "normal" running the torque converter is subject to a certain slip, so that its output angular velocity is approximately equal to 0.9 times that of the input. In this case the predetermined velocity at which the controlled friction clutch becomes engaged is established in such a way that it corresponds to the point where synchronism exists between the speed at which the driven shaft is driven by either the fixed ratio transmission mechanism or by the variable ratio transmission mechanism. In this way, the variable ratio transmission mechanism takes over from the fixed ratio transmission mechanism without any noticeable interruption to the smooth progress of the vehicle.

In transmission units of the "V.D.T." type or the like, provided with a centrifugal clutch, the complete coupling of this clutch occurs at a rather high angular velocity, axially between 2,200 and 2,500 revolutions per minute: because of this it is impossible to maintain the highest ratio at low speeds of the vehicle without slipping of the clutch, which is detrimental to the fuel consumption. A similar disadvantage is experienced if the centrifugal clutch is replaced by an hydraulic clutch.

In the transmission unit of the present invention it is possible to use a centrifugal clutch or an hydraulic clutch as the progressive coupling device, whilst nevertheless eliminating the said disadvantage, by providing the fixed ratio transmission mechanism with a greater reduction ratio than the maximum reduction ratio of the variable ratio transmission mechanism and forming the automatically controlled friction clutch as a progressive coupling type. Preferably, the fixed ratio transmission mechanism has a reduction ratio about 1.5 times greater than the maximum reduction ratio of the variable ratio transmission mechanism.

Also in this case there is obtained a notable increase of the "span" or range of ratios of the transmission unit, since there exists a fixed reduction ratio, that is to say a lower gear, below the range of variation of the variable ratios, thereby also providing an increase in the torque available when moving off from rest. It is necessary however, in this case that the automatically controlled friction clutch be of the progressive coupling type to allow a smooth transition from the fixed ratio transmission mechanism to the variable ratio transmission mechanism, because of the "jump" in the ratio.

Also, in this case, the presence of a lower, fixed ratio gear permits the "span" or range of variation of the variable ratios of the variable transmission mechanism to be displaced towards the higher gears by an amount which is amply sufficient to allow an "overdrive" effect. Thus, when the variable transmission mechanism is engaged, it is possible to maintain the highest gear without causing slipping of the progressive coupling, because such slipping is prevented by the direct connection between the engine and the variable transmission mechanism.

Three embodiments of the present invention will now be more particularly described, by way of example, with reference to the accompanying drawings, in which.

Figure 1:
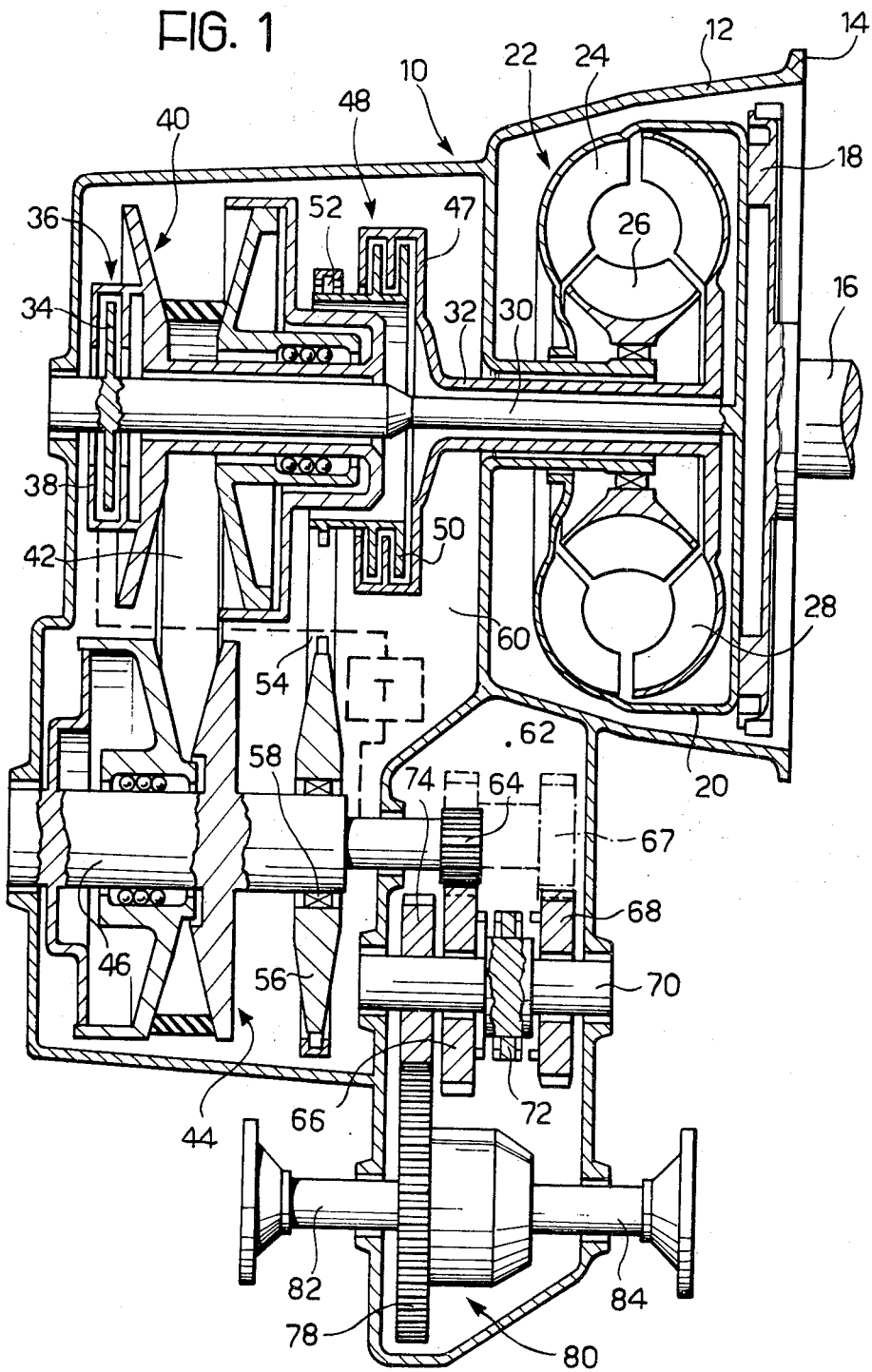
FIG. 1 is a schematic axial section of a first embodiment of the invention.

The three transmission units schematically illustrated in the drawings are all adapted for front wheel drive motor vehicles with transverse engines. In these schematic drawings all the parts not necessary for the comprehension of the invention, such as rolling bearings, seals and the like, have been omitted.

Referring now to FIG. 1, the transmission unit shown comprises an outer casing 10 made, for example, of light alloy and having a plurality of internal compartments including a part in the form of a bell 12 with a flange 14 for fixing the casing 10 to the cylinder block of an internal combustion engine (not shown) of a motor land vehicle. The engine has an output shaft 16 serving as the drive shaft for the transmission unit and carrying the usual flywheel 18. To the flywheel 18 there is coaxially fixed the casing 20 of an hydraulic torque converter, generally indicated 22.

The torque converter 22 includes, in a known way for such devices, a rotor or pump 24 rigidly connected to the casing 20, a stator 26 and a turbine 28. A shaft 30 is rigidly connected, by means of the flywheel 18 and the casing 20 to the drive shaft 16. The shaft 30 extends centrally through the casing 20 and the bell 12 and projects from the side opposite the shaft 16. Through the casing 20 and the bell 12 there extends, also centrally, a hollow shaft 32 which is rigidly connected for rotation with the turbine 28.

To the end of the shaft 30 remote from the flywheel 18 is keyed a drive element or disc 34 of a friction clutch, generally indicated 36. The driven part of the clutch 36, indicated 38, is rigidly connected to the axially fixed side of an expandable pulley, generally indicated 40, which is mounted coaxially and freely rotatably about the central shaft 30.

The expandable pulley 40 is the driving pulley of a transmission mechanism having automatically variable ratios, of the well known "V.D.T." type, incorporating a metal belt 42 which connects the driving pulley 40 to a driven expandable pulley generally indicated 44, which is rigidly connected for rotation with a driven shaft 46 parallel to the shaft 30. As is known, upon rotation of the driving pulley 40, drive is transmitted to the driven pulley 44. Variations in speed and load cause different expansions of the two expandable pulleys to vary the transmission ratio.

The hollow shaft 32 is rigidly connected for rotation to the driving part 47 of a multiple disc friction clutch, generally indicated 48, which is disposed about the central shaft 30 next to the pulley 40. The clutch 48 has a driven part 50 to which is rigidly connected for rotation a chain wheel 52 which forms part of a chain transmission including a chain 54 and another, larger, chain wheel 56, which is situated next to the driven pulley 44 and is rotatably mounted coaxially on the shaft 46 with the interposition of a free wheel clutch 58.

All of the above-described components, that is the series arrangement of the friction clutch 36 and the variable ratio transmission 40,42,44 and, in parallel with this arrangement, a second series arrangement comprising the clutch 48, the fixed ratio transmission 52,54,56 and the free wheel clutch 58, are enclosed in a compartment 60 of the housing 10.

The driven shaft 46 projects from the compartment 60 on the same side as the bell 12 and projects into another compartment 62 of the housing 10, situated adjacent to and below the bell 12. Within the compartment 62, the shaft 46 carries a toothed pinion 64 which meshes either with a toothed wheel 66 of the forward gear or with one of the pinions of a pair of reversing pinions 67 the other pinion of which is in mesh with a toothed wheel 68 of the reverse gear.

The forward gear wheel 66 and reverse gear wheel 68 are mounted rotatably on a transmission shaft 70 on which is slidably keyed, between the two wheels 66 and 68, a selector sleeve 72 which forms part of a double dog clutch which serves to key the wheel 66 or the wheel 68 selectively onto the transmission shaft 70 in its two end positions respectively, and to define the neutral condition in its central position.

To the transmission shaft 70 there is also keyed a toothed pinion 74 which is in mesh with a toothed crown wheel 78 rigidly connected to the casing of a differential gear, generally indicated 80, which is also located in the same compartment 62. From the differential gear 80, in opposite directions, project two output shafts to which in use are coupled the half shafts which transmit the drive to the front wheels of the motor vehicle. The two shafts 82 and 84 are parallel to the shafts 30 and 46.

The operation of the transmission unit illustrated in FIG. 1, is as follows:

When the motor vehicle is stationary with the engine running slowly or idling, the drive shaft 16 and the "central" shaft 30 are in rotation at low speed. The friction clutch 36 is a controlled clutch in that it has associated with it control means sensitive to the angular velocity of the drive shaft 46 and therefore to the speed of the vehicle. These means may include, for example, a tachometric generator diagrammatically shown at T which is associated with the shaft 46. Such control means are so formed that, with the vehicle stationary and the engine idling the controlled friction clutch 36 is disengaged, so that the driving pulley 40 of the variable ratio transmission is stationary.

The multiple disc clutch 48 is a separation clutch which has no other function than that of preventing the fixed ratio transmission mechanism comprising the chain wheels 52,56 and chain 54 from being drawn into rotation when the vehicle is stationary with the motor idling, which would cause rotation of the shaft 46. In fact, in these conditions, it is inevitable that the pump 24 of the torque converter 22 will slowly drag the turbine 28 into rotation. This rotation, if transmitted to the driven shaft 46, would make it difficult and noisy to engage forward or reverse gear by means of the sleeve 72 and, on such engagement, would give rise to a small shock or jerk of the vehicle forward or backward. The multiple disc clutch 48 is therefore controlled in such a way that it will be disengaged when the sleeve 72 is in the neutral position. This can be achieved, for example, by linking the clutch control to a gear lever or other gear selecting member, or else by putting the clutch 48 under the control of the accelerator pedal of the vehicle in such a way that with the pedal fully raised the clutch 48 will be disengaged.

When, by means of the appropriate gear lever, the sleeve 72 is displaced in such a way as to engage forward or reverse gear, or else, after effecting such manoeuvre, when the accelerator pedal is pressed, the separation clutch 48 gradually engages, whilst the controlled clutch 36 remains still disengaged. In this way the drive of the drive shaft 16 is transmitted from the pump 24 to the turbine 28 and from this to the fixed ratio transmission 52,54,56 and finally to the driven shaft 46 with a reduction ratio which depends on the difference in the diameters of the two chain wheels 52 and 56, whilst the parallel transmission 40,42,44 is inactive.

The vehicle can thus move off from rest with a high initial reduction ratio of the transmission unit, determined in part by the slip of the torque converter 22. This reduction ratio reduces progressively until the point at which the torque converter reaches its minimum slip condition when angular velocity of the turbine 28 reaches a value approximately equal to (that is about 90% of) the angular velocity of the pump 24. The reduction ratio of the fixed ratio transmission mechanism 52,54,56 is of course selected to take account of this slippage. In particular, the reduction ratio is chosen to be equal to the maximum reduction ratio of the variable ratio transmission 40,42,44, multiplied by the coefficient of minimum slip of the torque converter 22, which normally is of the order of 0.9.

The control means for the clutch 36, which are sensitive to the angular velocity of the driven shaft 46, are thus calibrated to cause the engagement of the clutch 36 when the shaft 46, driven by the fixed ratio transmission 52,54,56 reaches a predetermined velocity corresponding to that at which the minimum slip condition of the torque converter 22 occurs during normal operation. As will be understood, the engagement of the clutch 36 in these conditions causes the driven shaft 46 to be drawn into rotation through the variable ratio transmission mechanism 40,42,44 at substantially the same velocity as that at which it is caused to rotate by the fixed ratio transmission mechanism 52,54,56.

Upon increasing the speed of the engine and therefore the angular velocity of the shafts 16 and 30, the variable ratio transmission mechanism 40,42,44 takes over and, thanks to the presence of the free wheel clutch 58, the fixed ratio transmission mechanism 52,54,56 idles and does not transmit power.

From this point onwards the variable ratio transmission mechanism 40,42,44 performs its normal function, the transmission ratio being automatically varied in the known way by its normal control members (not shown).

Whenever the vehicle decelerates by an amount such as to reduce the angular velocity of the driven shaft 46 below the said predetermined value, the clutch 36 becomes disengaged and the transmission unit as a whole returns to the conditions under which it operates when moving off from rest, with the power being transmitted through the torque converter 22 and the fixed ratio transmission mechanism 52,54,56.

Figure 2:
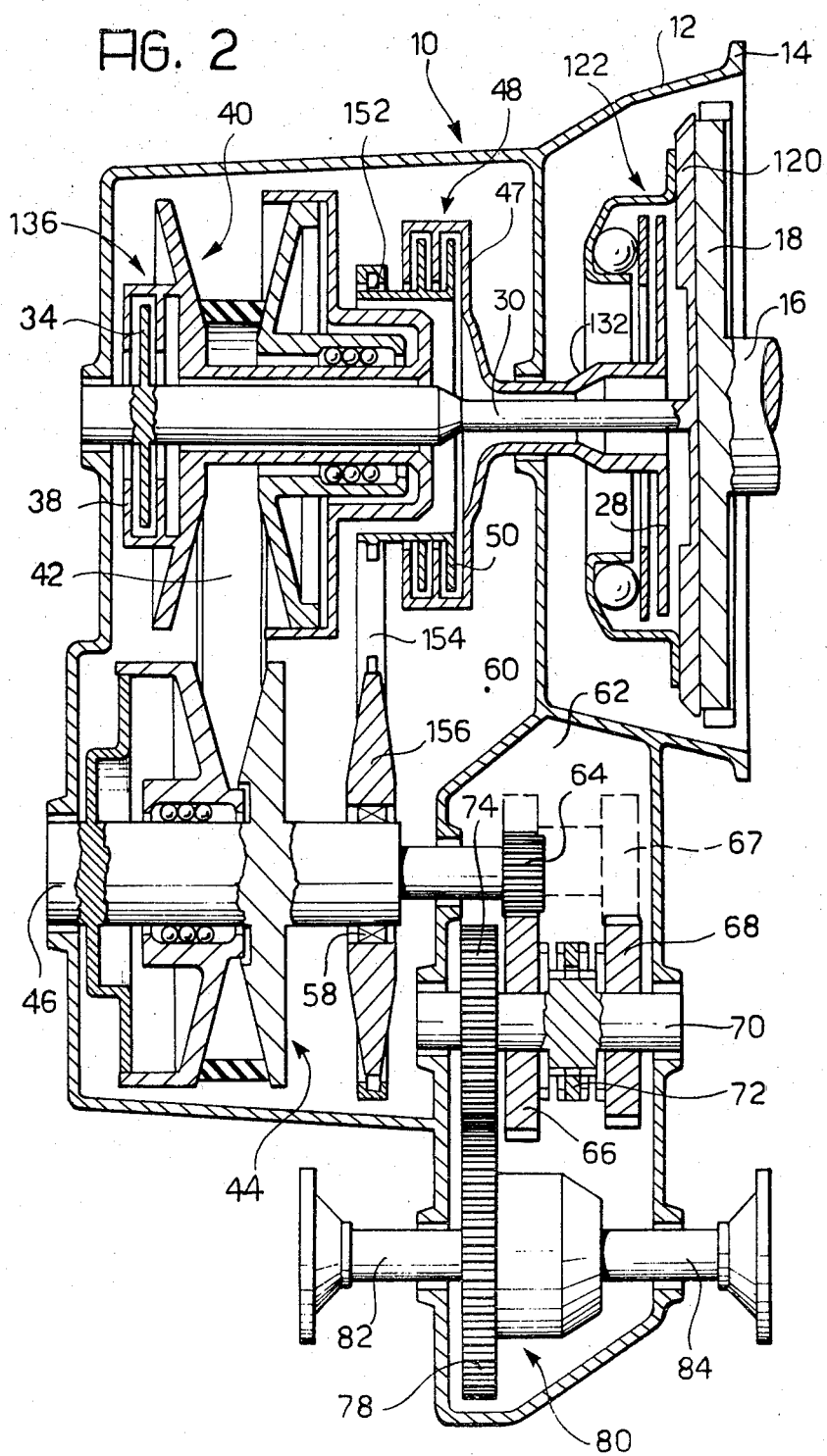
FIG. 2 is a schematic axial section of a second embodiment of the invention.

Referring now to FIG. 2, the embodiment shown therein is a transmission unit rather similar to that of FIG. 1, but of more economic design. The component parts of the transmission unit of FIG. 2 which are the same as corresponding component parts of the unit of FIG. 1 have been designated with the same reference numerals, whilst those parts which are similar, but which differ as to construction or function, have been designated with corresponding numerals increased by 100. The construction and operation of the component parts identical with corresponding parts in FIG. 1 will not be described further.

The embodiment of FIG. 2 differs from that of FIG. 1 by the fact that the flywheel 18 has associated with it a drive plate or disc 120, with a centrifugal friction clutch, generally indicated 122, having a drive plate or disc 128 which is rigidly connected for rotation with the hollow shaft 132. The fixed ratio transmission mechanism 152, 154, 156 differs from that of FIG. 1 only by the fact that its reduction ratio is greater than the maximum reduction ratio of the variable ratio transmission mechanism 40,42,44. This serves to provide, when the vehicle is moving off from rest, a high fixed reduction ratio in place of the variable reduction ratio given by the torque converter in the embodiment of FIG. 1. Preferably, the reduction ratio provided by the fixed ratio transmission mechanism 152, 154, 156 is in the region of 1.5 times greater than the maximum reduction ratio provided by the variable ratio transmission mechanism 40,42,44.

The transmission unit of FIG. 2 differs from that of FIG. 1 in only one other detail, that is to say by the fact that the controlled friction clutch 136 which serves to connect the central shaft 30 to the driving pulley 40, rather than being engaged sharply as in the embodiment of FIG. 1, is in this embodiment progressively engaged. This serves to avoid any jolt or jerk upon the change from power transmission through the fixed ratio transmission mechanism 152, 154, 156, to power transmission through the variable ratio transmission mechanism 40,42,44 and vice versa, which jolt or jerk would be caused by the sharp jump in effective reduction ratio upon making the change.

As will be understood, the embodiment of FIG. 2 is more economical than that of FIG. 1, given the lower cost of a centrifugal clutch with respect to that of a torque converter. The centrifugal clutch could be replaced by an hydraulic coupling device or by another coupling having progressive engagement.

Figure 3:
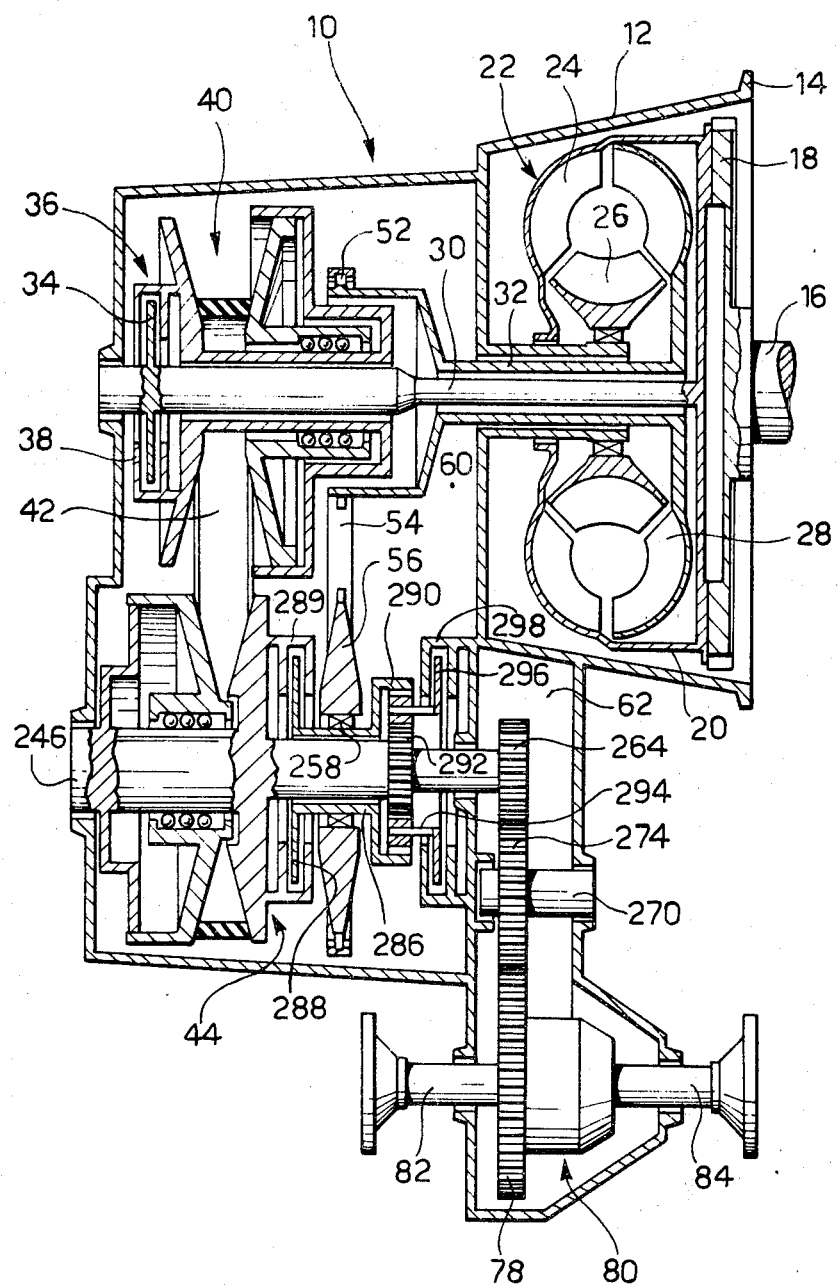
FIG. 3 is a schematic axial section of a third embodiment of the invention.

In FIG. 3 there is illustrated another embodiment, which differs from that of FIG. 1 in relation to the reversing gear. In FIG. 3, the component parts which are identical or similar to those of FIG. 1 have been designated with the same reference numerals, and it is therefore considered unnecessary to describe them in detail. The parts which differ conceptually or functionally from those of FIG. 1 have been designated with reference numerals increased by 200.

In FIG. 3 the driven or internal part of the free wheel clutch 258 is keyed onto a sleeve or hollow shaft 286 to which is rigidly connected the drive disc 288 of a friction clutch the driven part 289 of which is rigidly connected to the fixed side of the driven expandable pulley of the variable ratio transmission mechanism 40,42,44 and, by means of this, to the driven shaft 246. To the sleeve 286 there is also rigidly connected the crown wheel 290 of an epicyclic gear mechanism the sun wheel 292 of which is keyed onto the driven shaft 246. Between the sun wheel 292 and the crown wheel 290 there are interposed a plurality of planets carried on a planet carrier 294 to which is rigidly connected a disc 296 of a friction brake having a stator part 298 which is rigidly connected to the housing 10.

On the driven shaft 246 there is keyed a toothed pinion 264 which, via an intermediate pinion 274 carried by a small transmission shaft 270, drives the crown wheel 78 of the differential 80. As will be noted, in the embodiment of FIG. 3 there is no separation clutch between the hollow shaft 32 and the driving chain wheel 52 of the fixed ratio transmission mechanism.

In the embodiment of FIG. 3 the manner in which the transmission ratio varies is identical to that of the embodiment of FIG. 1. When the vehicle is to move off the friction clutch 288, 289 is engaged by means of a suitable lever (not shown). The brake 296, 298 fulfils the function of the separation clutch 48 of FIG. 1. In this way the sleeve 286 is progressively coupled for rotation with the driven shaft 246; when this coupling is effected the transmission unit behaves in the same way as that of FIG. 1, with the changeover from the fixed ratio transmission mechanism 52,54,56 to the variable ratio transmission mechanism 40,42,44 at the end of the initial acceleration on moving off.

To engage reverse gear the brake 296,298 is engaged by means of the manual control lever whilst the clutch 288,289 remains disengaged. Again the brake 296,298 performs the same function as the clutch 48 of FIG. 1. The engagement of the brake 296, 298 locks the planet carrier 294, so that the drive which comes from the chain wheel 56 is now transmitted in the reverse sense to the driven shaft 246 by means of the free wheel clutch 258, the sleeve 286, the crown wheel 290, the planets of the planet carrier 294 and the sun wheel 292.

As will be understood, a vehicle fitted with the embodiment of FIG. 3 can move in reverse gear only through the fixed ratio transmission 52,54,56, that is to say with only the range of ratios provided by the torque converter 22.

In another embodiment (not shown) the torque converter could be replaced by a progressive coupling device, such as a centrifugal clutch or an hydraulic coupling device. In such a case the fixed ratio transmission mechanism would be the same as that of the embodiment of FIG. 2 and with the driving pulley of the variable ratio transmission mechanism there would be associated a progressive action clutch such as the clutch 13 of the embodiment of FIG. 2. Alternatively, the variable ratio transmission mechanism could be different from the expandable pulley transmission shown in the drawings and could consist, for example, of an automatic discontinuous transmission mechanism having several discrete ratios. Likewise, the fixed ratio transmission mechanism, instead of being of the chain type, could comprise a cascade of gears.

What is claimed is:

1. In a transmission unit for a motor vehicle, of the type comprising:
   a drive shaft,
   a driven shaft for connecting said transmission unit to the propulsion members of the vehicle, and
   an automatic, variable ratio, transmission mechanism for interconnecting the drive shaft and the driven shaft,
   the improvement wherein there is provided a first series arrangement comprising:
   an automatically controlled friction clutch disposed mechanically in series with said variable ratio transmission mechanism, and
   control means for said friction clutch sensitive to the angular velocity of said driven shaft and operating to maintain said friction clutch disengaged below a predetermined angular velocity of said driven shaft and engaged above this predetermined angular velocity, and,
   a second series arrangement comprising:
   (i) a fixed ratio transmission mechanism and,
   (ii) a free wheel clutch, disposed mechanically in parallel with said first series arrangement of said controlled friction clutch and said variable ratio transmission mechanism between said drive shaft and said driven shaft, said free wheel clutch operating to transmit drive from said drive shaft to said driven shaft through said fixed ratio transmission mechanism when said controlled friction clutch is disengaged.

2. The transmission unit of claim 1, wherein said series arrangement of said automatically controlled friction clutch and said variable ratio transmission mechanism has an input shaft connected directly to said drive shaft of said transmission unit, and said series arrangement of said fixed ratio transmission mechanism and said free wheel clutch has an input shaft, a progressive coupling device connecting said free wheel clutch input shaft to said drive shaft.

3. The transmission unit of claim 2, wherein said progressive coupling device is an hydraulic torque convertor.

4. The transmission unit of claim 3, wherein said fixed ratio transmission mechanism has a reduction ratio substantially equal to the maximum reduction ratio of said variable ratio transmission mechanism multiplied by the minimum coefficient of slip of said torque convertor.

5. The transmission unit of claim 2, wherein said progressive coupling device is a centrifugal clutch.

6. The transmission unit of claim 2, wherein said progressive coupling is an hydraulic coupling.

7. The transmission unit of claim 5 or claim 6, wherein said fixed ratio transmission mechanism has a greater reduction ratio than the maximum reduction ratio of said variable ratio transmission mechanism, and said automatically controlled friction clutch is of the type having progressive engagement.

8. The transmission unit of claim 7, wherein said fixed ratio transmission mechanism has a reduction ratio about 1.5 times greater than the maximum reduction ratio of said variable ratio transmission mechanism.

9. The transmission unit of claim 1, wherein said automatically controlled friction clutch is disposed mechanically upstream of said variable ratio transmission mechanism.

10. The transmission unit of claim 1, wherein said free wheel clutch is disposed mechanically downstream of said fixed ratio transmission mechanism.

11. The transmission unit of claim 2, wherein said driven shaft has associated with it a reversing gear of the type having dog clutches for reversing the rotational sense of the drive to the propulsion members, and said series arrangement comprising said fixed ratio transmission mechanism and said free wheel clutch further includes a friction clutch for uncoupling this arrangement from said input shaft.

12. The transmission unit of claim 11, wherein said friction clutch for uncoupling said arrangement from said input shaft is situated mechanically upstream of said series arrangement of said fixed ratio transmission mechanism and said free wheel clutch.

13. The transmission unit of claim 2, wherein said driven shaft has a reversing gear of the epicyclic type associated therewith for reversing the sense of the output drive, such reversing gear including:
  a sun wheel directly connected to said driven shaft,
  a crown wheel connected to the output of said series arrangement of said fixed ratio transmission mechanism and said free wheel clutch,
  a lockable planet carrier,
  a friction clutch for coupling said crown wheel and said driven shaft for rotation together for forward drive transmission, and
  a brake for locking said planet carrier against rotation for reverse drive transmission.

14. The transmission unit of claim 2, wherein said variable ratio transmission mechanism is a belt transmission including:
  a central shaft,
  a driving expandable pulley freely rotatably mounted on said central shaft and rigidly connected for rotation with said drive shaft and
  a driven pulley mounted for rotation with said driven shaft, said automatically controlled friction clutch including:
  a driving part rigidly connected for rotation with said central shaft, and
  a driven part rigidly connected for rotation with said expandable driving pulley, said progressive coupling device including:
  a hollow shaft coaxially surrounding said central shaft,
  a driving part rigidly connected for rotation with said central shaft and said drive shaft, and
  a driven part rigidly connected for rotation with said hollow shaft, and said fixed ratio transmission mechanism including:
  a driving toothed wheel situated adjacent to said expandable driving pulley, coaxially surrounding said central shaft, and
  a driven toothed wheel situated next to said driven pulley and coaxially rotatably mounted on said driven shaft via said free wheel clutch.

15. The transmission unit of claim 14, wherein said two toothed wheels are chain wheels interconnected by a transmission chain.

16. The transmission unit of claim 14 or claim 15, wherein a single casing encloses all the members of said transmission unit, including a reversing gear.

17. The transmission unit of claim 16, wherein said casing also encloses a differential output unit the axis of which is parallel to that of said drive and driven shafts.

* * * * *